(12) United States Patent
Ding

(10) Patent No.: US 11,169,400 B2
(45) Date of Patent: Nov. 9, 2021

(54) OPTICAL ARTICLE COMPRISING AN INTERFERENTIAL COATING WITH A HIGH REFLECTION IN THE NEAR INFRARED REGION (NIR)

(71) Applicant: ESSILOR INTERNATIONAL, Charenton-le-Pont (FR)

(72) Inventor: Xingzhao Ding, Singapore (SG)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 312 days.

(21) Appl. No.: 16/323,293

(22) PCT Filed: Aug. 9, 2017

(86) PCT No.: PCT/EP2017/070196
§ 371 (c)(1),
(2) Date: Feb. 5, 2019

(87) PCT Pub. No.: WO2018/029251
PCT Pub. Date: Feb. 15, 2018

(65) Prior Publication Data
US 2020/0183189 A1 Jun. 11, 2020

(30) Foreign Application Priority Data
Aug. 9, 2016 (EP) ..................... 16306040

(51) Int. Cl.
G02C 7/10 (2006.01)
G02B 5/28 (2006.01)
G02B 1/115 (2015.01)
(52) U.S. Cl.
CPC .............. *G02C 7/107* (2013.01); *G02B 1/115* (2013.01); *G02B 5/282* (2013.01)

(58) Field of Classification Search
CPC ......... G02C 7/107; G02B 5/282; G02B 1/115
See application file for complete search history.

(56) References Cited

U.S. PATENT DOCUMENTS

| 4,211,823 A | 7/1980 | Suzuki et al. |
| 5,015,523 A | 5/1991 | Kawashima et al. |

(Continued)

FOREIGN PATENT DOCUMENTS

| CN | 101866063 | 10/2010 |
| EP | 0614957 | 9/1994 |

(Continued)

OTHER PUBLICATIONS

International Search Report and Written Opinion issued in International Patent Application No. PCT/EP2017/070196, dated Nov. 2, 2017.

*Primary Examiner* — Wen Huang
(74) *Attorney, Agent, or Firm* — Norton Rose Fulbright US LLP

(57) ABSTRACT

This invention relates to an optical article comprising a transparent substrate with a front main face and with a rear main face, at least one of the main faces being coated with an interferential coating, characterized in that said interferential coating comprises a stack comprising: —at least one layer having a low refractive index which is <1.6, called "LI layer", —at least one HI/VHI/HI triplet of three layers composed of one layer: •having a very high refractive index which is ≥2.1, called "VHI layer", •surrounded on both sides by two layers having a high refractive index which is ≥1.6, called "HI layers", and such that the mean reflectance in ultra violet (UV) region $R_{uv}$ of said interferential coating is lower than or equal to 10% at an angle of incidence comprised between 30° and 45°.

16 Claims, 3 Drawing Sheets

(56) References Cited

U.S. PATENT DOCUMENTS

| | | |
|---|---|---|
| 2010/0330378 A1 | 12/2010 | Takahashi et al. |
| 2013/0038834 A1 | 2/2013 | Cado et al. |
| 2014/0009835 A1 | 1/2014 | Shibuya et al. |
| 2015/0146161 A1 | 5/2015 | Rigato et al. |

FOREIGN PATENT DOCUMENTS

| | | |
|---|---|---|
| FR | 2943798 | 10/2010 |
| WO | WO 2011/080472 | 7/2011 |

OPTICAL ARTICLE COMPRISING AN INTERFERENTIAL COATING WITH A HIGH REFLECTION IN THE NEAR INFRARED REGION (NIR)

CROSS-REFERENCE TO RELATED APPLICATIONS

This application is a national phase application under 35 U.S.C. § 371 of International Application No. PCT/EP2017/070196, filed Aug. 9, 2017, which claims priority to and the benefit of European Patent Application No. 16306040.3, filed Aug. 9, 2016. The contents of the referenced patent applications are incorporated into the present application by reference.

FIELD OF THE INVENTION

The present invention relates to an optical article comprising an antireflective coating having high reflection in the near infrared (NIR) region, while also strongly reducing reflection in the ultraviolet and visible region. The optical article may especially be an ophthalmic lens, such as a spectacle lens.

DESCRIPTION OF RELATED ART

Throughout life, the eye is exposed to daily fluxes of solar radiation. Solar radiation is filtered by the Earth's atmosphere so that at sea level about 80% of the solar energy is restricted to a narrow spectral band from about 300 nm in the ultraviolet to 1100 nm in the infrared. Longer wavelengths are primarily filtered out by atmospheric water vapor, whereas shorter wavelengths are absorbed by the ozone layer. Furthermore, certain spectral components of solar light incident on the cornea are partially filtered out before reaching the human retina. Both the cornea and the lens absorb part of the infrared radiation—mainly the water bands at 980 nm, 1200 nm, and 1430 nm. The vitreous absorbs light above 1400 nm, up to 10 µm.

It has been noted that intensive NIR would be harmful to retina. It has been also reported that NIR could be one of the potential causes for dry eyes and cataracts.

The solar spectrum comprises also ultraviolet radiation (UV). The UV spectrum has many bands, especially UVA, UVB and UVC bands. Amongst those UV bands which do reach the earth surface, UVA band, ranging from 315 nm to 380, and UVB band, ranging from 280 nm to 315 nm, are particularly harmful to the retina.

Thus, the non-ionizing radiation reaching the retina, the so-called 'visible component' of the electromagnetic spectrum (380-780 nm), some of the ultraviolet (280-380 nm) and some of the near infrared (780-1400 nm, NIR), may reach the human retina and induce tissue damage via at least one of three fundamental processes: photomechanical (or photoacoustic), photothermal (photocoagulation) and photochemical, depending on its fluence rate, total dose and spectral characteristics.

Traditional antireflective coatings are designed and optimized to reduce reflection on the lens surface in the visible region, typically within the spectrum range of from 380 to 780 nm. In general, the mean light reflection factor in the visible region $R_v$ on the front and/or rear faces of an ophtalmic lens is between 1.5 to 2.5%. Generally, the reflection in the ultraviolet region (280-380 nm) and in the NIR region (780-1400 nm) is not optimized.

Some of these antireflective coatings may also be designed and optimized to reduce reflection on the lens surface within the UVA band of from 315 to 380 nm and/or the UVB band of from 280 to 315 nm.

An antireflection coating usually consists of a multilayer comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

Accordingly, it is nowadays well known how to achieve an efficient coating with very low reflection in visible region; however it is difficult to achieve an efficient coating having simultaneously:
  a very low reflection in visible region;
  a low reflection in the ultraviolet region and
  a high reflection in the NIR region, especially in the ophthalmic field requiring very thin antireflective film.

Indeed, requirements for ultraviolet and NIR are different for an optical article placed in front of a human eye.

The mean reflection in the UVA and UVB regions on the front face of the optical article is not relevant, since the major part of the ultraviolet radiation which comes from the front of the wearer and might attain the wearer's eye generally get absorbed by the optical article substrate.

On the other hand, the ultraviolet radiation resulting from light sources or reflections located behind the wearer may reflect on the optical article rear face and reach the wearer's eye if the optical article is not provided with an antireflective coating which is efficient in the ultraviolet region, thus potentially affecting the wearer's health. In other words, an antireflective coating is required on rear face when dealing with ultraviolet light.

For NIR radiation, the situation is actually different. NIR radiation is usually not absorbed by optical substrates. Then, the reflecting coating may be either on front face or on rear face of the optical article. In both cases, a high reflection in the NIR region means that the optical article behaves like a mirror for NIR and protects the eye.

Besides, NIR radiation is mainly coming from sun directly on the front face of the optical article not from alternative artificial light sources or sunlight reflection. A high reflection for NIR radiation coming from behind the wearer is not problematic.

Last, some ranges of visible light may have detrimental influence on eyes. Blue light, also known as high-energy visible (HEV) light, corresponds to visible light in the blue-violet band between 380 and 500 nm. Prolonged exposure to blue light is harmful as blue light is able to reach the retina. Blue light in the range from about 420 to 450 nm is believed to be especially harmful.

It is known in the art to provide interferential multilayer with very low reflection in the ultraviolet range (US 2013/0038834), in particular for ophthalmic lenses.

It is known in the art to provide interferential multilayer IR filters for ophthalmic lenses (such as CN 101866063) which have in general more than 40 layers. These kinds of stacks are thick and have many layers, which is not acceptable practically for ophthalmic lens applications.

Recently, the document US2015/0146161 describes a multilayer that reflects a significant percentage of infra-red radiation while it maintains the anti-reflective properties in the visible, with a limited angular dispersion in the residual reflection, by adapting standard anti-reflective filter technology.

The antireflective coatings described in this application, especially the most preferred example: $SiO_2$(15 nm)/$TiO_2$ (127 nm)/$SiO_2$(176 nm)/$TiO_2$(59 nm)/$ZrO_2$(50 nm)/$SiO_2$(62 nm), are quite efficient in the NIR region (T IR-A=72.0%, so the $R_m^{NIR}$<30%), while being at the same time capable of relatively reducing the reflection in the visible region ($R_v$ 15°=0.9% and $R_v$ 60°=4.7%). However, reflection in the ultraviolet range is not optimized and was measured to be higher than 10%, providing poor protection against UV radiation on rear face of ophthalmic lenses.

Therefore, there is still a need to provide novel antireflective coatings having very good antireflective properties at least in the visible region and in the UVA and UVB bands, while having at the same time high reflection in the NIR region versus the antireflective coatings of the prior art.

SUMMARY OF THE INVENTION

An object of the invention is therefore to remedy the above drawbacks, by seeking to develop a transparent optical article, especially an ophthalmic lens, comprising a substrate in mineral or organic glass comprising at least an antireflective coating, said antireflective coating possessing very good antireflective performances in the visible region and in ultraviolet region, while having high reflection in the NIR region and to do so without compromising the economic and/or industrial feasibility of its manufacture.

The invention therefore relates to an optical article comprising a transparent substrate with a front main face and with a rear main face, at least one of the main faces being coated with an interferential coating, characterized in that said interferential coating comprises a stack comprising:
- at least one layer having a low refractive index which is <1.6, called "LI layer",
- at least one HI/VHI/HI triplet of three layers composed of one layer:
  - having a very high refractive index which is ≥2.1, called "VHI layer",
  - surrounded on both sides by two layers having a high refractive index which is ≥1.6, called "HI layers"

such that the mean reflectance in ultra violet (UV) region $R_{uv}$ of said interferential coating is lower than or equal to 10% at an angle of incidence comprised between 30° and 45°.

Therefore, the optical article according to the invention comprises a high efficient anti-reflective coating in visible and ultraviolet regions with high reflection in the NIR region.

BRIEF DESCRIPTION OF THE DRAWING

The present invention will be described in more detail by referring to the appended drawings, wherein.

DETAILED DESCRIPTION OF THE INVENTION AND PREFERRED EMBODIMENTS

Figure 1:
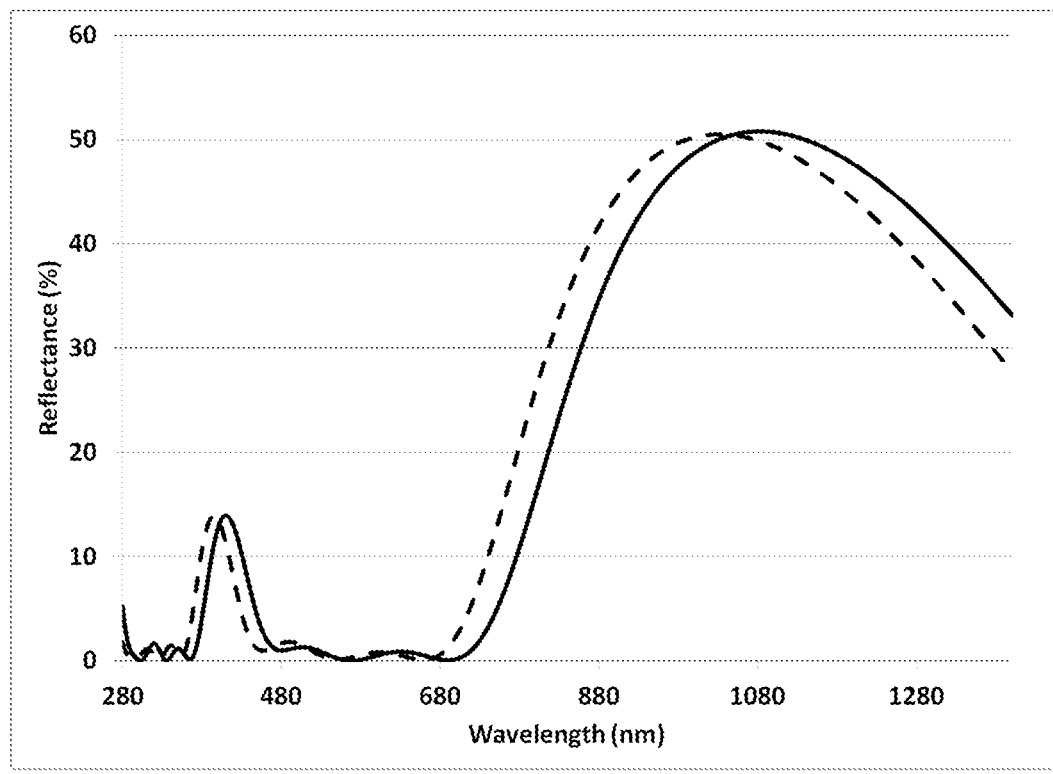
FIGS. 1 to 4 show the variation of reflectance (R %) on the front surface of some lenses prepared in the examples of the present application (respectively according to examples 2, 4, 6 and 13) at an angle of incidence θ of 15° (solid line) and 35° (dotted line) as a function of light wavelength in the UVB band (280 to 315 nm), UVA band (315 to 380 nm), visible region (380 to 780 nm) and in the NIR region (780 to 1400 nm).
Figure 2:
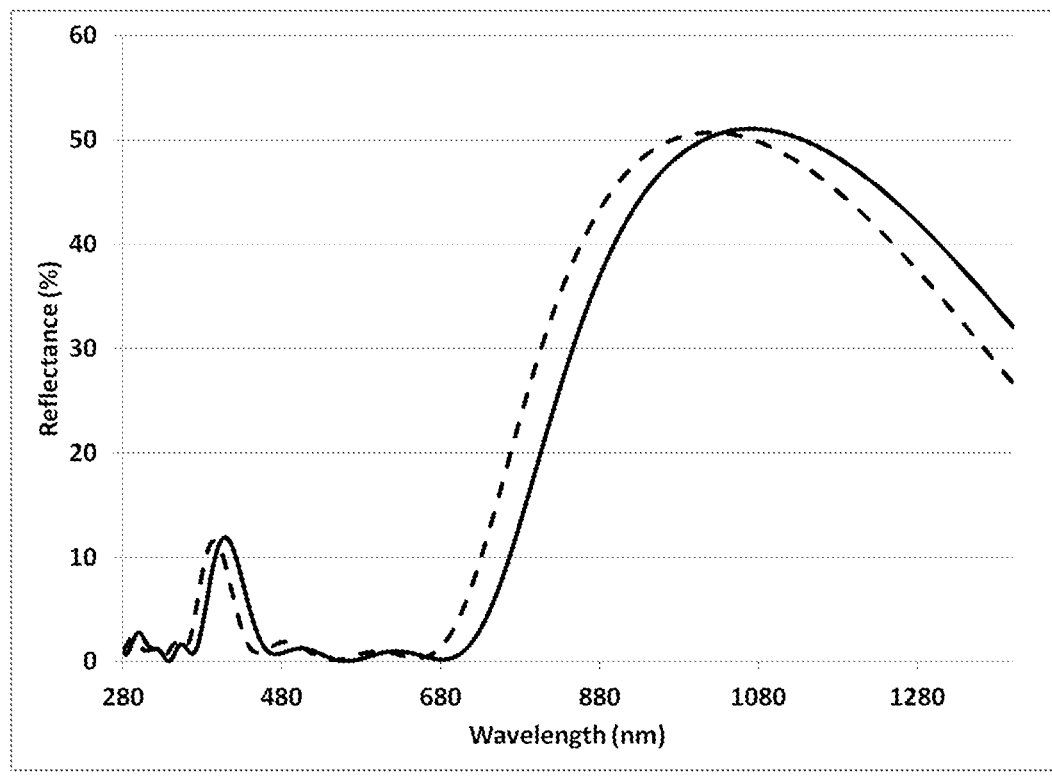
Figure 3:
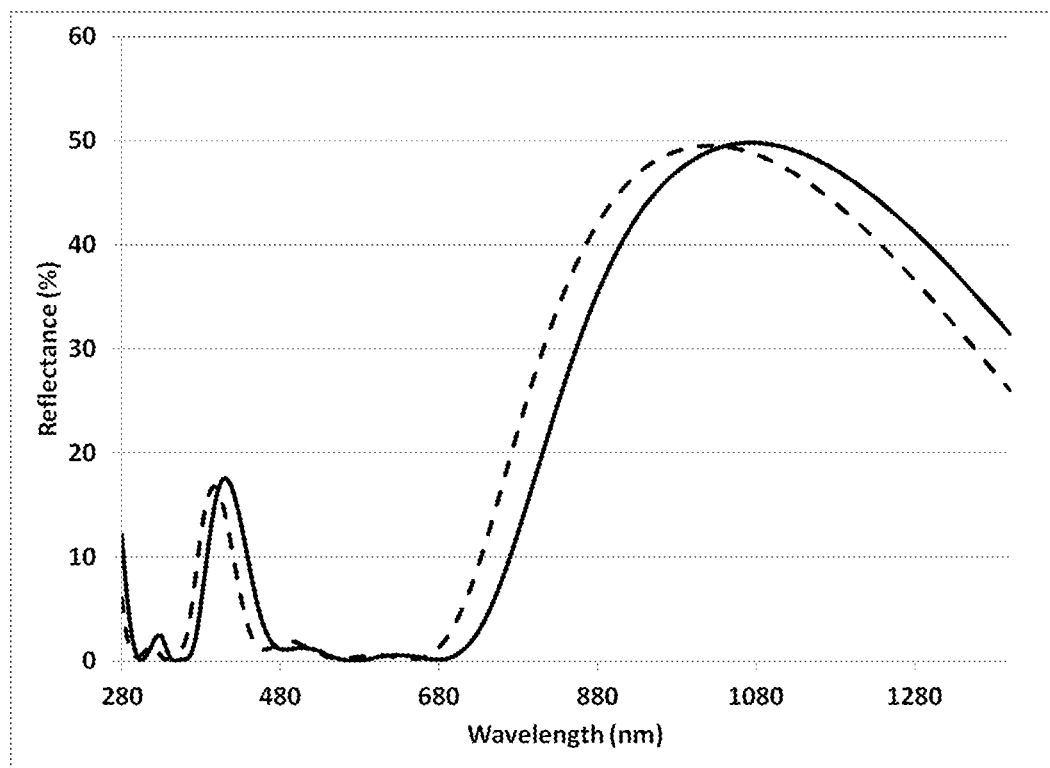
Figure 4:
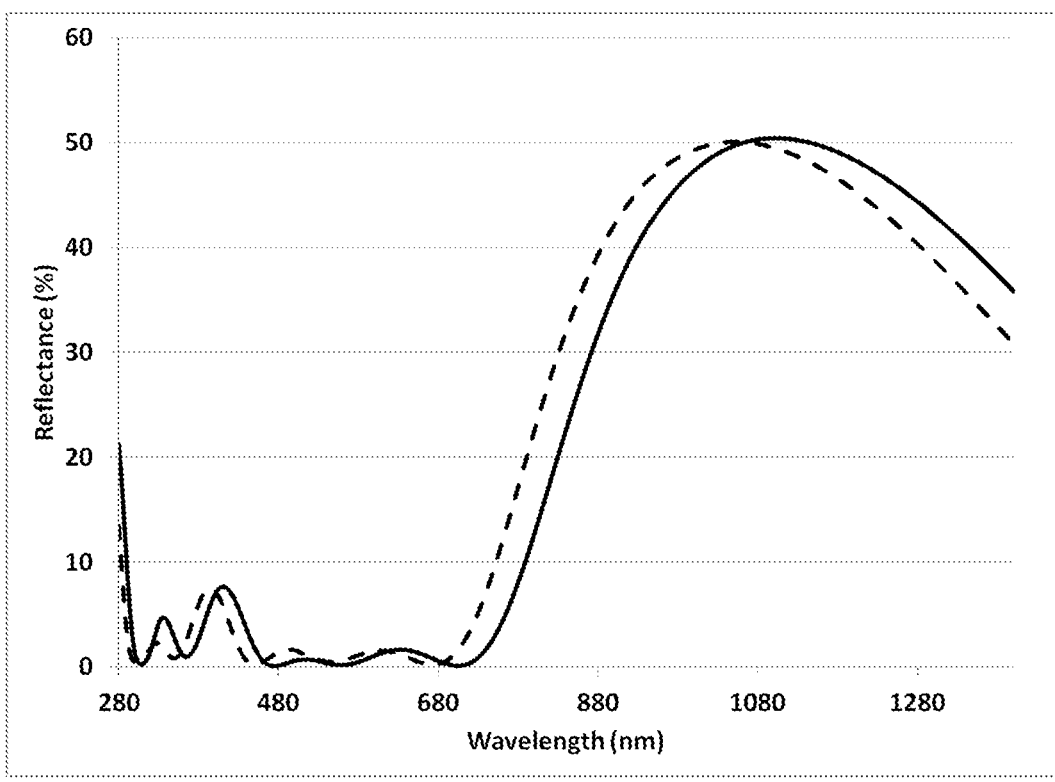

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values «from X to Y» or "between X to Y", according to the present invention, means as including the values of X and Y.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

In addition, according to the invention, the "angle of incidence (symbol θ)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

The colorimetric coefficients of the optical article of the invention in the international colorimetric system CIE L*a*b* are calculated between 380 and 780 nm, taking the standard illuminant D 65 and the observer into account (angle of 10°). The observer is a "standard observer" as defined in the international colorimetric system CIE L*a*b*.

Generally speaking, the interferential coating of the optical article according to the invention, which will be called "the antireflective coating", may be deposited onto any substrate, and preferably onto organic lens substrates, for example a thermoplastic or thermosetting plastic material. Thermoplastic may be selected from, for instance: polyamides; polyimide; polysulfones; polycarbonates and copolymers thereof; poly(ethylene terephtalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth)acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR 39®), allylic and (meth)acrylic copolymers, having a refractive index between 1,54 and 1,58, polymer and copolymer of thiourethane, polycarbonates are preferred.

The substrate may be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating. In the following a substrate means either a bare substrate or such a coated substrate.

Prior to depositing the antireflective coating, the surface of said substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

As previously mentioned, the optical article according to the present invention is a transparent substrate with a front main face and with a rear main face, at least one of the main faces being coated with an interferential coating, characterized in that said interferential coating comprises a stack comprising:
at least one layer having a low refractive index which is <1.6, called "LI layer",
at least one HI/VHI/HI triplet of three layers composed of one layer:
having a very high refractive index which is 2.1, called "VHI layer",
surrounded on both sides by two layers having a high refractive index which is ≥1.6, called "HI layers"
such that the mean reflectance in ultra violet (UV) region $R_{uv}$ of said interferential coating is lower than or equal to 10% at an angle of incidence comprised between 30° and 45°.

In the present application, a triplet is made from the deposition of a first high refractive index material on which a very high refractive index material is directly deposited, on which a second high refractive index material is directly deposited. The first and the second high refractive index materials may be different. The first and/or the second high refractive index materials may be very high refractive index materials.

In some particular embodiment, the triplet is composed of a central layer made of a very high refractive index material surrounded on both sides by two layers made of the same high refractive index material, the very high refractive index material and high refractive index material being different.

In specific embodiments, the refractive index of the central layer is higher than the refractive index of the two surrounding layers, made from the same or different high refractive index materials.

In the present application, the mean reflection factor between 280 nm and 380 nm, weighted by the W(λ) function and noted $R_{uv}$, may be defined through the following relation:

$$R_{UV} = \frac{\int_{280}^{380} W(\lambda) \cdot R(\lambda) \cdot d\lambda}{\int_{280}^{380} W(\lambda) \cdot d\lambda}$$

wherein R(λ) represents the lens spectral reflection factor at a given wavelength λ, and W(λ) represents a weighting function equal to the product of the solar spectrum irradiance Es(λ) and the efficiency relative spectral function S(λ). The spectral function W(λ), enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy Es(λ) into account, which does globally emit less UVB-rays as compared to UVA-rays, and the spectral efficiency S(λ), UVB-rays being more harmful than UVA-rays.

The Applicant has surprisingly discovered that the multilayered interferential coating according to the invention shows good compromise between low $R_v$, low $R_{uv}$ and high mean reflection factor in the NIR region, while having a relatively thin physical thickness, in general in the range 400-550 nm.

Indeed, as it will be shown in the examples below, the multilayered antireflective coating according to the invention enables to obtain a minimum achievable $R_v \leq 0.7\%$ with a minimum achievable $R_{uv} \leq 2\%$ and a high mean reflection factor in NIR region (780-1400 nm). These good results are not achievable with conventional designs based for instance on the followings structures comprising four alternating layers made of high and low refractive index material: $ZrO_2/SiO_2/ZrO_2/SiO_2$; $Ta_2O_5/SiO_2/Ta_2O_5/SiO_2$; $TiO_2/SiO_2/TiO_2/SiO_2$ and/or $Nb_2O_5/SiO_2/Nb_2O_5/SiO_2$.

In addition, the multilayered interferential coating according to the invention presents the advantage of having a good robustness and aesthetic appearance. Herein, the term "robustness" of an interferential coating is defined as its ability to show similar optical performances despite the variations induced by its manufacture process. These variations depend, for instance, on the type of substrate which is used, the setting of the manufacturing machine (temperature schedule, appropriate time, setting of the electron gun . . . ) and/or its usage mode, the replacement of said manufacturing machine by another one.

The multilayered interferential coatings described in this application are very efficient in the visible region. Especially, the mean light reflection factor in the visible region $R_v$ of the antireflective coating is lower than or equal to 2.5%, preferably lower than or equal to 1.5%, and is in general lower than or equal to 1.0%, for at least an angle of incidence lower than 35°.

The "mean light reflection factor," noted $R_v$, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

Preferably, the mean reflection factor in the near infrared (NIR) region $R_m^{NIR}$ of the interferential coating is higher than or equal to 30%, preferably 35%, more preferably 40% at an angle of incidence lower than 35°.

The mean reflection factor in the near infrared region (NIR: 780-1400 nm), noted $R_m^{NIR}$, is defined by the formula:

$$R_m^{NIR} = \frac{\int_{780}^{1400} R(\lambda)d\lambda}{1400 - 780}$$

wherein $R(\lambda)$ represents the reflection factor at a given wavelength $\lambda$.

Preferably, the mean reflection factor in the ultraviolet region $R_{uv}$ of the interferential coating is lower than or equal to 5%, preferably lower than or equal to 3%, at an angle of incidence comprised between 30° and 45°.

In addition, in this invention, the averaged reflection factor for blue light, noted RmB, is defined as the spectral reflection average over the blue light range between 420 nm and 450 nm.

Preferably, the averaged reflection factor for blue light RmB of the interferential coating is higher than or equal to 10%, preferably 15%, at an angle of incidence lower than 35°.

The multilayered interferential coating of the invention comprises a HI/VHI/HI triplet of three layers composed of one layer:
  having a very high refractive index which is ≥2.1, called "VHI layer",
  surrounded on both sides by two layers having a high refractive index which is ≥1.6, called "HI layers"

The existence of the very high index (VHI) layers is favorable for achieving high NIR reflection, while sandwiching the VHI layer between two high index (HI) layers makes it possible or easier to achieve very low reflection in both UV and visible regions.

As used herein, a layer of the interferential coating is defined as having a thickness higher than or equal to 1 nm. Thus, any layer having a thickness lower than 1 nm will not be considered when counting the number of layers in the interferential coating. A sub-layer (such as described below) either is not considered when counting the number of layers of the interferential coating.

Thicknesses disclosed in the present application relate to physical thicknesses.

Refractive indexes referred to in the present application are expressed at 25° C. at a wavelength of 550 nm.

HI layers, VHI layers and LI layers don't need to alternate with each other in the stack, although they also may, according to one embodiment of the invention. Thus, two VHI layers (or more) may be deposited onto each other, as well as two LI layers (or more) or two HI layers (or more) may be deposited onto each other.

In some embodiments, the HI/VHI/HI triplet is composed of one layer:
  having a very high refractive index which is 2.1, called "VHI layer",
  surrounded on both sides by two layers having a high refractive index which is ≥1.6 and <2.1.

In some embodiments, HI/VHI/HI triplet is the nearest from the substrate. According to an embodiment of the invention, said triplet is in direct contact with the substrate, and according to another embodiment, said triplet is not in direct contact with the substrate since this one may be coated with one or more functional coatings, such as described below.

According to the invention, the interferential coating comprises at least one layer having a low refractive index which is <1.6, called "LI layer".

In some embodiments, said LI layer is directly deposited onto HI/VHI/HI triplet.

In general, the outer layer of said interferential coating which is the furthest from the substrate is an LI layer.

The layer total number in the interferential coating of the invention is generally higher than or equal to 5, preferably higher than or equal to 6, and lower than or equal to 10, more preferably lower than or equal to 9.

In some embodiments, interferential coating according to the invention comprises only one triplet.

In these embodiments, the interferential coating comprises in the direction moving away from the substrate, the following layers which are in direct contact with each other: one HI/VHI/HI triplet or one HI layer/one LI layer/one HI/VHI/HI triplet or one HI layer/one LI layer, provided that there is one triplet in the interferential coating.

In a specific embodiment, the interferential coating comprises in the direction moving away from the substrate:
  one HI layer or one HI/VHI/HI triplet having a physical thickness ranging from 100 to 170 nm;
  one LI layer having a physical thickness ranging from 100 to 215 nm, preferably from 100 to 200 nm;
  one HI layer or one HI/VHI/HI triplet having a physical thickness ranging from 90 to 130 nm;
  one LI layer having a physical thickness ranging from 45 to 80 nm.

Here, the physical thickness of a triplet is the sum of the three physical thicknesses of the three layers composing the triplet.

In a preferred embodiment, interferential coating according to the invention comprises at least two HI/VHI/HI triplets.

More preferably, the interferential coating comprises in the direction moving away from the substrate, the following layers which are in direct contact with each other: one HI/VHI/HI triplet/one LI layer/one HI/VHI/HI triplet/one LI layer.

In a specific embodiment, the interferential coating comprises in the direction moving away from the substrate:
- one HI layer having a physical thickness ranging from 40 to 75 nm;
- one VHI layer having a physical thickness ranging from 45 to 85 nm;
- one HI layer having a physical thickness ranging from 20 to 50 nm;
- one LI layer having a physical thickness ranging from 100 to 215 nm, preferably from 100 to 200 nm;
- one HI layer having a physical thickness ranging from 20 to 70 nm;
- one VHI layer having a physical thickness ranging from 5 to 80 nm;
- one HI layer having a physical thickness ranging from 25 to 50 nm;
- one LI layer having a physical thickness ranging from 45 to 80 nm.

Especially, according to this embodiment, the interferential coating may comprise in the direction moving away from the substrate:
- one HI layer having a physical thickness ranging from 35 to 64 nm;
- one VHI layer having a physical thickness ranging from 40 to 80 nm;
- one HI layer having a physical thickness ranging from 25 to 45 nm;
- one LI layer having a physical thickness ranging from 120 to 180 nm;
- one HI layer having a physical thickness ranging from 20 to 70 nm;
- one VHI layer having a physical thickness ranging from 5 to 50 nm;
- one HI layer having a physical thickness ranging from 30 to 50 nm;
- one LI layer having a physical thickness ranging from 50 to 75 nm.

In the present application, a layer of the interferential coating is said to be a layer with a very high refractive index (VHI) when its refractive index is higher than or equal to 2.1, preferably higher than or equal to 2.2, even more preferably higher than or equal to 2.3, even more preferably higher than or equal to 2.35. Said VHI layer preferably has a refractive index lower than 3.

The VHI layer according to the invention may comprise, without limitation, one or more metal oxides selected from: niobium oxide ($Nb_2O_5$), tantalum pentoxide ($Ta_2O_5$), titanium dioxide ($TiO_2$) or mixture thereof. Optionally, the VHI layers may further contain materials with a low refractive index or a high refractive index provided the refractive index of the resulting layer is higher than or equal to 2.1 as indicated hereabove.

Generally, the VHI layers have a physical thickness ranging from 5 to 90 nm, preferably from 20 to 85 nm and typically from 25 to 80 nm.

A layer of the antireflective coating is said to be a high refractive index (HI) when its refractive index is higher than or equal to 1.6. A VHI layer is a specific embodiment of a HI layer.

The HI layer may comprise one or more metal oxides such as, without limitation, zirconia ($ZrO_2$), alumina ($Al_2O_3$), praseodymium oxide ($Pr_2O_3$), praseodymium titanate ($PrTiO_3$), lanthanum oxide ($La_2O_3$), yttrium oxide ($Y_2O_3$), niobium oxide ($Nb_2O_5$), tantalum pentoxide ($Ta_2O_5$), titanium dioxide ($TiO_2$) and mixtures thereof. The preferred material includes zirconia ($ZrO_2$). Optionally, the HI layers may further contain silica or other materials with a low refractive index, provided the refractive index of the resulting layer is higher than or equal to 1.6 as indicated hereabove.

In particular, the HI layers which are not VHI layers may have a physical thickness ranging from 15 to 90 nm, preferably ranging from 20 to 80 nm and typically from 25 to 75 nm.

A layer of the antireflective coating is said to be a low refractive index layer (LI) when its refractive index is lower than 1.60, preferably lower than or equal to 1.50, more preferably lower than or equal to 1.48. Said LI layer preferably has a refractive index higher than 1.1.

The LI layer may comprise, without limitation, $MgF_2$, $SiO_2$, a mixture of silica and alumina, especially silica doped with alumina (the latter contributing to increase the antireflective coating thermal resistance), or a mixture thereof. The LI layer is preferably a layer comprising at least 80% by weight of silica, more preferably at least 90% by weight of silica, relative to the layer total weight, and even more preferably consists in a silica layer ($SiO_2$). Optionally, the LI layers may further contain materials with a high refractive index or very high refractive index, provided the refractive index of the resulting layer is lower than to 1.6.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

In addition, the LI layers may have a physical thickness ranging from 40 to 215 nm. In general, the outer LI layer has a thickness which is ranging from 40 to 90 nm, preferably from 45 to 80 nm.

Generally, the interferential coating total thickness is lower than 1 micrometer, preferably lower than or equal to 800 nm, more preferably lower than or equal to 700 nm and even more preferably lower than or equal to 600 nm. The interferential coating total thickness is generally higher than 100 nm, preferably higher than 200 nm, more preferably higher than or equal to 300 nm and even more preferably higher than or equal to 400 nm. Typically, the physical thickness of said interferential coating is ranging from 400 to 550 nm.

The present invention provides hence an interferential coating with an improved conception, comprising a relatively thin stack made of layers, the thicknesses and materials of which have been selected so as to obtain satisfactory antireflective performances both in the visible and ultraviolet region and high reflection in the NIR region, while having robustness properties.

In one embodiment of the present invention, the interferential coating may be deposited onto a sub-layer. It should be noted that such interferential coating sub-layer does not belong to the interferential coating.

As used herein, an interferential coating sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the interferential optical activity, especially when it has a refractive index close to that of the underlying substrate (which is generally the anti-abrasion and anti-scratch coating or the bare substrate.

In general, the interferential coating is not deposited onto a sub-layer.

The optical article of the invention may be made antistatic, that is to say not to retain and/or develop a substantial static charge, by incorporating at least one electrically conductive layer into the stack present on the surface of the article.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof. In the present application, discharge times are measured according to the method exposed in the French application FR 2 943 798.

The electrically conductive layer may be located on various places in the stack, generally in or in contact with the antireflective coating, provided the anti-reflective properties thereof are not affected.

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminium-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer or a tin oxide layer.

Generally, the electrically conductive layer contributes, within the stack, but in a limited manner, because of its low thickness, to obtain antireflective properties and represents a layer with a high refractive index in the antireflective coating. This is the case for those layers made from an electrically conductive and highly transparent material such as ITO layers.

The various layers of the interferential coating and the optional sub-layer are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the interferential coating and of the optional sub-layer is conducted by evaporation under vacuum.

The interferential coatings of the front face and of the rear face may be the same or different.

In an embodiment of the invention, the front face and the rear face of the optical article of the invention are coated with the interferential coating described above. In another embodiment, the front face of the optical article of the invention is coated with a conventional antireflective coating, preferably with high reflection in the NIR region, different from the one provided on its rear face which is according to the invention.

Generally, the front and/or rear main face of the substrate onto which an interferential coating will be deposited is coated with an impact-resistant primer layer, with an anti-abrasion and/or anti-scratch coating, or with an impact-resistant primer layer coated with an anti-abrasion and/or anti-scratch coating.

The interferential coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts. Refractive index of these hard anti-abrasion and/or scratch-resistant coatings may be adjusted by incorporation of mineral particles.

Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523. The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions are compositions based on polyurethanes and compositions based on latexes, especially polyurethane type latexes optionally containing polyester units.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 μm, preferably of from 0.5 to 1.5 μm.

The optical article according to the invention may also comprise coatings formed on the interferential coating and capable of modifying the surface properties thereof, such as hydrophobic and/or oleophobic coatings (antifouling top coat). These coatings are preferably deposited onto the outer layer of the interferential coating. As a rule, their thickness is lower than or equal to 10 nm, does preferably range from 1 to 10 nm, more preferably from 1 to 5 nm.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, an optical article according to the invention comprises a substrate that is successively coated on its rear face and front face with an impact-resistant primer layer, an abrasion-resistant layer and/or a scratch-resistant layer, an interferential coating according to the invention on rear face, a conventional antireflective coating, preferably with high reflection in the NIR region, on front face and with a hydrophobic and/or oleophobic coating.

The optical article according to the invention is a transparent optical article, preferably an ophthalmic lens, especially a spectacle lens, or a blank for ophthalmic lenses. The lens may be a polarized lens, a photochromic lens or a solar lens, which may be tinted or not, be corrective, or not.

In one embodiment, the optical article according to the invention does not absorb in the visible or not much, which means, in the context of the present application, that its transmission factor in the visible range $\tau_v$, also called relative transmission factor in the visible range, is higher than 90%, more preferably higher than 95%, even more preferably higher than 96% and most preferably higher than 97%. The factor $\tau_v$ should be understood as defined by the international normalized definition (ISO 13666:1998 Standard) and is measured in accordance with the ISO 8980-3 Standard. It is defined in the wavelength range of from 380 to 780 nm. Preferably, the light reflected by multilayered interferential coating has a hue angle (h) from 250° to 400°, preferably from 275° to 350°, more preferably from 280° to 325° according to the international colorimetric CIE L*a*b* for an angle of incidence θ of less than or equal to 35°, preferably lower than or equal 30, in particular lower than or equal 25° and typically lower than or equal 20°. In addition, the inventors observed that the multilayered interferential coating according to the invention have a great colorimetric reliability, i.e. the hue angle h and the chroma C* of reflected light were particularly robust: the optical performances of the antireflective coatings do not vary much when thicknesses of layers vary, due to production process variability (standard deviations for hue angle and Chroma are σh*≤3 and σC*≤9).

The following examples illustrate the present invention in a more detailed, but non-limiting manner.

EXAMPLES

1. General Procedures

The optical articles used in the examples comprise a lens substrate, having a 65 mm diameter, a refractive index of 1.50 (ORMA® lens from ESSILOR) or 1.60 (MR-8 lens from MITSUI), and a power of −2,00 diopters and a center thickness of 1.2 mm, coated on its front and rear faces with the following anti-abrasion and scratch-resistant coating.

The anti-abrasion and scratch-resistant coating disclosed in Example 3 of the patent EP 0 614 957 (refractive index equal to 1.47 and thickness of 3.5 μm), based on a hydrolyzate composed of GLYMO and DMDES, of colloidal silica and aluminium acetylacetonate is deposited on the substrate.

Said anti-abrasion and scratch-resistant coating was obtained by depositing and hardening a composition comprising by weight, 224 parts of GLYMO, 80.5 parts of HCl 0.1 N, 120 parts of DMDES, 718 parts of 30% by weight colloidal silica in methanol, 15 parts of aluminium acetylacetonate and 44 parts of ethylcellosolve. The composition also contained 0.1% of surfactant FLUORAD™ FC-430® manufactured by 3M, by weight relative to the composition total weight.

The anti-abrasion and scratch-resistant coating described above has a refractive index about 1.5 (hereinafter HC1.5) and is used for substrates having a refractive index of 1.5.

For substrates having a refractive index of 1.6, titanium dioxide particles are added in anti-abrasion and scratch-resistant coating described above to match a refractive index of 1.6 (hereinafter HC1.6).

Then an antireflective coating according to the present invention is deposited on front face. The layers of the antireflective coating were deposited without heating the substrates by evaporation under vacuum (evaporation source: electron gun).

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

2. Test Procedure

The method for making optical articles comprises the step of introducing the substrate, coated on its rear or front face with the anti-abrasion and scratch-resistant coating, into a vacuum deposition chamber, a step of pumping until a high-vacuum is obtained, a step of activating the surface of the substrate by means of an argon ion beam (anode current: 1 A, anode voltage: 100 V, neutralization current: 130 mA), turning the ion irradiation off, then forming subsequently the various layers of the antireflective coating by successive evaporations and at last a ventilation step.

3. Results

The structural characteristics and the optical performances of the ophthalmic lenses obtained in the Examples 1 to 22 are detailed hereunder. Examples 1 to 18 correspond to a particular embodiment of the invention in which the interferential coating comprises two triplets. Examples 19 to 22 correspond to another embodiment of the invention in which the interferential coating comprises only one triplet.

The reflection graphs between 280 and 1400 nm of some articles prepared are illustrated on FIGS. 1-4 (respectively examples 2, 4, 6 and 13, with various angles of incidence: 15°—solid line and 35°—dotted line). The optical values are those of the front face. Factors $R_m^{NIR}$, $R_v$, RmB, Chroma (C*) and hue angle (h) of reflected light are provided for an angle of incidence of 15°, a standard illuminant D65 and a standard observer (angle 10°). $R_{uv}$ is provided for an angle of incidence of 35°, with standard illuminant D65 and a standard observer (angle 10°).

Example 1

| Material | Thickness (nm) |
|---|---|
| SiO2 | 66.72 |
| ZrO2 | 43.91 |
| TiO2 | 44.57 |
| ZrO2 | 30.12 |
| SiO2 | 158.55 |
| ZrO2 | 34.95 |
| TiO2 | 59.23 |
| ZrO2 | 54.77 |
| Substrate + HC1.5 | |
| Thickness | 492.82 |
| Rv15° | 0.60% |
| $R_m^{NIR}$15° | 40.64% |
| Ruv 35° | 1.53% |
| RmB 15° | 12.9% |
| h* | 308 |
| σh* | 2.7 |
| C* | 58 |
| σC* | 5.2 |

Example 2

| Material | Thickness (nm) |
|---|---|
| SiO2 | 66.4 |
| ZrO2 | 45.44 |
| Nb2O5 | 40.5 |
| ZrO2 | 36.19 |
| SiO2 | 153.29 |
| ZrO2 | 35.42 |
| Nb2O5 | 61.29 |
| ZrO2 | 51.59 |
| Substrate + HC1.5 | |
| Thickness | 490.11 |
| Rv15° | 0.60% |
| $R_m^{NIR}$15° | 41.40% |
| Ruv 35° | 1.50% |
| RmB 15° | 8.6% |
| h* | 305 |
| σh* | 5.3 |
| C* | 44 |
| σC* | 6 |

Example 3

| Material | Thickness (nm) |
|---|---|
| SiO2 | 67.35 |
| ZrO2 | 55.06 |
| Ta2O5 | 31.9 |
| ZrO2 | 32.62 |
| SiO2 | 214.49 |
| ZrO2 | 26.05 |
| Ta2O5 | 83.3 |
| ZrO2 | 42.58 |
| Substrate + HC1.5 | |
| Thickness | 553.36 |
| Rv15° | 0.93% |
| $R_m^{NIR}$15° | 30.30% |
| Ruv 35° | 2.28% |
| RmB 15° | 21.6% |
| h | 311 |
| σh* | 1.8 |
| C* | 78 |
| σC* | 1.6 |

Example 4

| Material | Thickness (nm) |
|---|---|
| SiO2 | 61.49 |
| ZrO2 | 40.95 |
| Nb2O5 | 46.68 |
| ZrO2 | 31.96 |
| SiO2 | 149.67 |
| ZrO2 | 39.39 |
| TiO2 | 60.29 |
| ZrO2 | 52.17 |
| Substrate + HC1.5 | |
| Thickness | 482.6 |
| Rv15° | 0.60% |
| $R_m^{NIR}$15° | 41.90% |
| Ruv 35° | 1.61% |
| RmB 15° | 6.5% |
| h* | 306 |
| σh* | 7.6 |
| C* | 35 |
| σC* | 5.8 |

Example 5

| Material | Thickness (nm) |
|---|---|
| SiO2 | 68.02 |
| ZrO2 | 44.7 |
| TiO2 | 42.74 |
| ZrO2 | 32.21 |
| SiO2 | 157.4 |
| ZrO2 | 32.91 |
| Nb2O5 | 62.07 |
| ZrO2 | 53.02 |
| Substrate + HC1.5 | |
| Thickness | 493.07 |
| Rv15° | 0.60% |
| $R_m^{NIR}$15° | 41.10% |
| Ruv 35° | 1.60% |
| RmB 15° | 12.2% |
| h* | 308 |
| σh* | 2.9 |
| C* | 56 |
| σC* | 5.6 |

Example 6

| Material | Thickness (nm) |
|---|---|
| SiO2 | 67.87 |
| ZrO2 | 45.45 |
| TiO2 | 35.21 |
| Ta2O5 | 33.74 |
| SiO2 | 167.01 |
| Ta2O5 | 31.65 |
| TiO2 | 55.66 |
| ZrO2 | 52.74 |
| Substrate + HC1.5 | |
| Thickness | 489.34 |
| Rv15° | 0.60% |
| $R_m^{NIR}$15° | 40.70% |
| Ruv 35° | 1.59% |
| RmB 15° | 11.3% |
| h* | 306 |
| σh* | 4.2 |
| C* | 52 |
| σC* | 7.4 |

Example 7

| Material | Thickness (nm) |
|---|---|
| SiO2 | 71.01 |
| Ta2O5 | 37.3 |
| TiO2 | 29.86 |
| Ta2O5 | 39.46 |
| SiO2 | 162.76 |
| Ta2O5 | 27.46 |
| TiO2 | 54.13 |
| Ta2O5 | 52.4 |
| Substrate + HC1.5 | |
| Thickness | 474.36 |
| Rv15° | 0.63% |
| $R_m^{NIR}$15° | 42.20% |
| Ruv 35° | 1.90% |
| RmB 15° | 7.7% |
| h* | 310 |
| σh* | 7.5 |
| C* | 40 |
| σC* | 7.7 |

Example 8

| Material | Thickness (nm) |
|---|---|
| SiO2 | 69.25 |
| Ta2O5 | 46.5 |
| Nb2O5 | 32.71 |
| Ta2O5 | 35.89 |
| SiO2 | 187.48 |
| Ta2O5 | 28.23 |
| Nb2O5 | 58.21 |
| Ta2O5 | 53.26 |
| Substrate + HC1.5 | |
| Thickness | 511.52 |
| Rv15° | 0.82% |
| $R_m^{NIR}$15° | 41.50% |
| Ruv 35° | 3.31% |
| RmB 15° | 20.2% |
| h* | 313 |
| σh* | 1.5 |
| C* | 77 |
| σC* | 4.2 |

Example 9

| Material | Thickness (nm) |
|---|---|
| SiO2 | 69.42 |
| HfO2 | 45.34 |
| TiO2 | 44 |
| HfO2 | 27.97 |
| SiO2 | 152.31 |
| HfO2 | 39.03 |
| TiO2 | 51.67 |
| HfO2 | 66.78 |
| Substrate + HC1.6 | |
| Thickness | 496.51 |
| Rv15° | 0.66% |
| $R_m^{NIR}$15° | 35.20% |
| Ruv 35° | 2.08% |
| RmB 15° | 18.9% |
| h* | 308 |
| σh* | 1.7 |
| C* | 73 |
| σC* | 3.1 |

Example 10

| Material | Thickness (nm) |
|---|---|
| SiO2 | 67.89 |
| HfO2 | 45.93 |
| Nb2O5 | 43.62 |
| HfO2 | 32.15 |
| SiO2 | 145.39 |
| HfO2 | 39.48 |
| Nb2O5 | 54.91 |
| HfO2 | 60.08 |
| Substrate + HC1.6 | |
| Thickness | 489.45 |
| Rv15° | 0.63% |
| $R_m^{NIR}$15° | 36.70% |
| Ruv 35° | 1.96% |
| RmB 15° | 12.7% |
| h* | 306 |
| σh* | 1.9 |
| C* | 59 |
| σC* | 3.3 |

Example 11

| Material | Thickness (nm) |
|---|---|
| SiO2 | 65.06 |
| HfO2 | 26 |
| Ta2O5 | 54.76 |
| HfO2 | 28.53 |
| SiO2 | 162.36 |
| HfO2 | 32.67 |
| Ta2O5 | 64.34 |
| HfO2 | 57.84 |
| Substrate + HC1.5 | |
| Thickness | 491.55 |
| Rv15° | 0.72% |
| $R_m^{NIR}$15° | 33.10% |
| Ruv 35° | 3.26% |
| RmB 15° | 3.7% |
| h* | 326 |
| σh* | 5.6 |
| C* | 29 |
| σC* | 5.5 |

Example 12

| Material | Thickness (nm) |
|---|---|
| SiO2 | 64.51 |
| ZrO2 | 43.72 |
| Nb2O5 | 46 |
| HfO2 | 34.73 |
| SiO2 | 145.82 |
| HfO2 | 37.81 |
| Nb2O5 | 63.02 |
| ZrO2 | 52.62 |
| Substrate + HC1.5 | |
| Thickness | 488.22 |
| Rv15° | 0.60% |
| $R_m^{NIR}$15° | 41.60% |
| Ruv 35° | 1.60% |
| RmB 15° | 8.4% |
| h* | 307 |
| sh* | 4.5 |
| C* | 44 |
| σC* | 5.4 |

Example 13

| Material | Thickness (nm) |
|---|---|
| SiO2 | 69.12 |
| Ta2O5 | 39.3 |
| Nb2O5 | 38.6 |
| ZrO2 | 42.92 |
| SiO2 | 158.99 |
| Ta2O5 | 34.47 |
| Nb2O5 | 70.11 |
| ZrO2 | 43.46 |
| Substrate + HC1.6 | |
| Thickness | 496.96 |
| Rv15° | 0.60% |
| $R_m^{NIR}$15° | 40.90% |
| Ruv 35° | 1.61% |
| RmB 15° | 4.5% |
| h* | 316 |
| σh* | 6.5 |
| C* | 30 |
| σC* | 6.6 |

Example 14

| Material | Thickness (nm) |
|---|---|
| SiO2 | 54.44 |
| HfO2 | 33.42 |
| TiO2 | 8.32 |
| Ta2O5 | 65.89 |
| SiO2 | 144.78 |
| Ta2O5 | 41.24 |
| TiO2 | 63.12 |
| HfO2 | 42.76 |
| Substrate + HC1.6 | |
| Thickness | 453.96 |
| Rv15° | 0.60% |
| $R_m^{NIR}$15° | 36.70% |
| Ruv 35° | 1.71% |
| RmB 15° | 2.5% |
| h* | 291 |
| σh* | 7.3 |
| C* | 25 |
| σC* | 4.1 |

Example 15

| Material | Thickness (nm) |
|---|---|
| SiO2 | 45.1 |
| Al2O3 | 25.31 |
| Nb2O5 | 65.55 |
| ZrO2 | 42.36 |
| SiO2 | 103.33 |
| ZrO2 | 45.72 |
| Nb2O5 | 76.01 |
| Al2O3 | 71.1 |
| Substrate + HC1.5 | |
| Thickness | 474.48 |
| Rv15° | 0.83% |
| $R_m^{NIR}$15° | 40.80% |
| Ruv 35° | 3.78% |
| RmB 15° | 5.1% |
| h* | 306 |
| σh* | 3.3 |
| C* | 31 |
| σC* | 4.1 |

Example 16

| Material | Thickness (nm) |
|---|---|
| SiO2 | 58.69 |
| ZrO2 | 26.77 |
| TiO2 | 52.2 |
| ZrO2 | 31.17 |
| SiO2 | 143.09 |
| ZrO2 | 55.36 |
| TiO2 | 80.28 |
| ZrO2 | 59.99 |
| Substrate + HC1.6 | |
| Thickness | 507.55 |
| Rv15° | 0.97% |
| $R_m^{NIR}$15° | 38.37% |
| Ruv 35° | 3.71% |
| RmB 15° | 1.32% |
| h* | 0 (red) |
| σh* | 7.1 |
| C* | 30 |
| σC* | 1.5 |

Example 17

| Material | Thickness (nm) |
|---|---|
| SiO2 | 61.61 |
| ZrO2 | 42.56 |
| TiO2 | 52.54 |
| ZrO2 | 22.05 |
| SiO2 | 140.06 |
| ZrO2 | 43.52 |
| TiO2 | 61.11 |
| ZrO2 | 42.92 |
| Substrate + HC1.6 | |
| Thickness | 466.37 |
| Rv15° | 1.00% |
| $R_m^{NIR}$15° | 39.53% |
| Ruv 35° | 2.68% |
| RmB 15° | 4.72% |
| h* | 260 (blue) |
| σh* | 9.1 |
| C* | 27 |
| σC* | 1.3 |

Example 18

| Material | Thickness (nm) |
|---|---|
| SiO2 | 56.2 |
| ZrO2 | 23.17 |
| TiO2 | 46.71 |
| ZrO2 | 37.13 |
| SiO2 | 118.37 |
| ZrO2 | 42.88 |
| TiO2 | 39.67 |
| ZrO2 | 51.72 |
| Substrate + HC1.6 | |
| Thickness | 415.85 |
| Rv15° | 0.95% |
| $R_m^{NIR}$15° | 35.00% |
| Ruv 35° | 4.31% |
| RmB 15° | 0.04% |
| h* | 35 (gold) |
| σh* | 12 |
| C* | 21 |
| σC* | 4.4 |

Example 19

| Material | Thickness (nm) |
|---|---|
| SiO2 | 74.7 |
| ZrO2 | 98.13 |

Example 20

| Material | Thickness (nm) |
|---|---|
| SiO2 | 73.02 |
| ZrO2 | 51.08 |

Example 21

| Material | Thickness (nm) |
|---|---|
| SiO2 | 65.79 |
| TiO2 | 101.24 |

-continued

| | | | | | |
|---|---|---|---|---|---|
| SiO2 | 169.14 | TiO2 | 10.58 | SiO2 | 170.16 |
| ZrO2 | 36.43 | ZrO2 | 52.24 | ZrO2 | 48.24 |
| TiO2 | 70 | SiO2 | 183.14 | TiO2 | 46.84 |
| ZrO2 | 48.85 | ZrO2 | 142.44 | ZrO2 | 66.46 |
| Substrate + HC1.5 | | Substrate + HC1.5 | | Substrate + HC1.5 | |
| Thickness | 497.25 | Thickness | 512.5 | Thickness | 498.73 |
| Rv15° | 0.73% | Rv15° | 0.98% | Rv15° | 0.99% |
| $R_m^{NIR}$15° | 35.74% | $R_m^{NIR}$15° | 31.03% | $R_m^{NIR}$15° | 43.13% |
| Ruv 35° | 2.36% | Ruv 35° | 4.67% | Ruv 35° | 8.23% |
| Rmb 15° | 5.15% | Rmb 15° | 8.44% | Rmb 15° | 11.85% |
| h* | 323 | h* | 310 | h* | 313 |
| σh* | 5.3 | σh* | 6.9 | σh* | 5.2 |
| C* | 35 | C* | 35 | C* | 50 |
| σC* | 6.1 | σC* | 8 | σC* | 5.7 |

Example 22

| Material | Thickness (nm) |
|---|---|
| SiO2 | 58.12 |
| ZrO2 | 26.08 |
| TiO2 | 50.97 |
| ZrO2 | 37.14 |
| SiO2 | 119.74 |
| TiO2 | 108.82 |
| Substrate + HC1.5 | |
| Thickness | 400.87 |
| Rv15° | 0.99% |
| $R_m^{NIR}$15° | 40.00% |
| Ruv 35° | 7.09% |
| Rmb 15° | 13.88% |
| h* | 308 |
| σh* | 3.8 |
| C* | 60.5 |
| σC* | 3.3 |

All these examples show that a very good compromise between low reflection in the visible region ($R_v$<1%, very often $R_v$<0.7%), low reflection in ultraviolet region ($R_{uv}$<10%, often $R_{uv}$<2%) and a high reflection in NIR region ($R_m^{NIR}$>30%).

These performances are met on several substrates having refractive index of 1.5 or 1.6 (and coated with suitable HC1.5 or HC1.6).

Examples 19-22 show a good compromise of performances with interferential coatings comprising one triplet. However, high reflectance in NIR region (>40%) results in poor reflection in the ultraviolet region ($R_{uv}$>5%). When $R_{uv}$ is improved to be lower than 5%, then reflection in NIR region is lowered.

Better results are obtained when two triplets are used, as shown on examples 1-18.

Examples 3 and 11 show that the high reflection in NIR region is lower ($R_m^{NIR}$ between 30% and 35%) than for other examples ($R_m^{NIR}$>35% and often $R_m^{NIR}$>40%). This is linked to the triplet structure of the invention: in examples 3 and 11, VHI layer is tantalum oxide, whose refractive index is 2.14 at 550 nm. In other examples, VHI layer is either niobium oxide ($Nb_2O_5$) or titanium dioxide ($TiO_2$), both having a refractive index larger than 2.3 at 550 nm. A higher refractive index for VHI layer yields better performance in NIR reflection.

Examples 1, 3, 5, 6, 8, 9 and 10 show in addition high averaged reflection factor for blue light RmB: higher than 10%, often higher than 15% and even higher than 20% for examples 3 and 8. These ophthalmic lenses provide an excellent protection against UV, NIR and blue light simultaneously. Off course, the light reflected by these ophthalmic lenses is clearly blue/purple and the Chroma of reflected light is high (up to 70 for the examples 3 and 8). The higher RmB, the higher the Chroma.

Besides, high Chroma is linked to the hue angle or reflected light of examples 1 to 15, purple in a hue range around 300°, in which color saturation is very high, even for very low amount of reflected light. In other words, residual reflection on these lenses would be of very low amount, but easily perceived by observers. When hue angle of reflected light differ from purple, as in examples 16 to 18, Chroma is lower.

Moreover, the lenses obtained in Examples 1 to 18 have outstanding transparency properties, a good resistance to abrasion and to scratches, and a good resistance to a hot water dip-treatment, followed with a mechanical stress on the surface. The adhesion of the coatings to the substrate was also very satisfactory. Last, robustness of these lenses is high. This is evidenced by standard deviations of Chroma and hue angle of reflected light, which are low (σC* lower than 9 and σh lower than 8).

Figure 5:
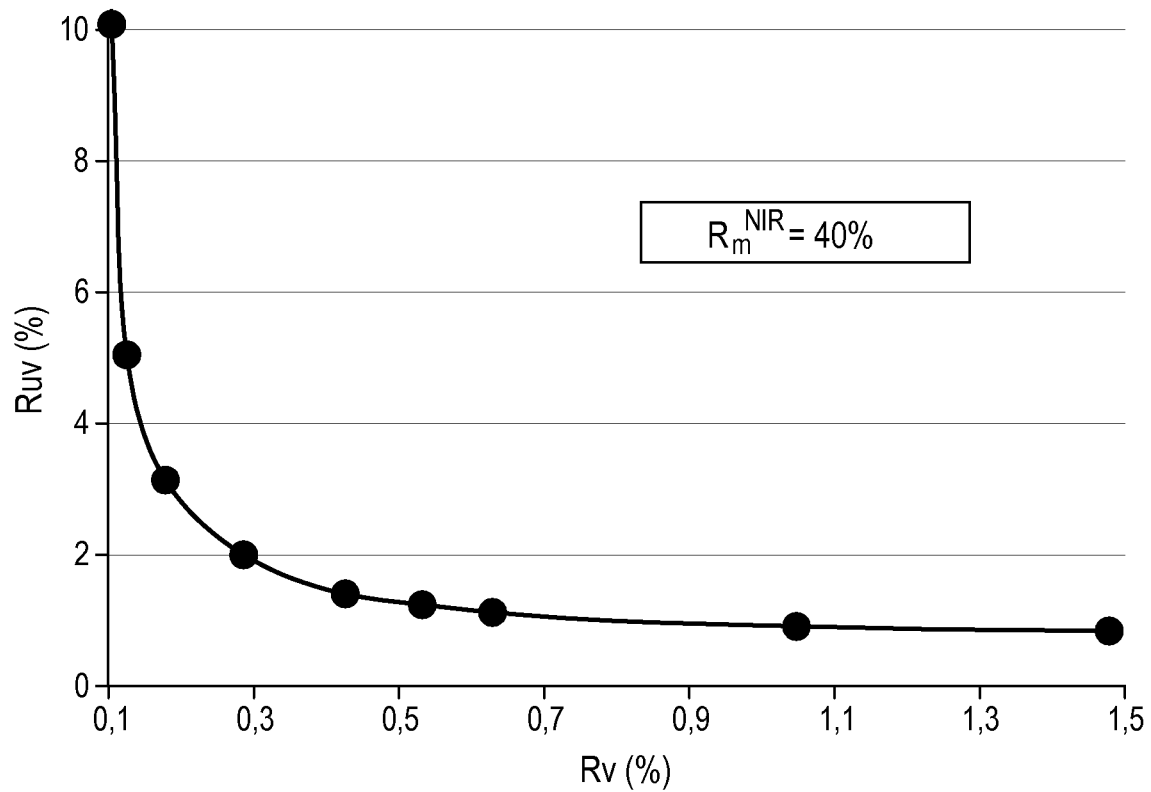
FIG. 5 show the compromise between $R_v$ and $R_{uv}$, for a given value of $R_m^{NIR}$ (40%), for ZTiZQZTiZQ stacks on a substrate coated with HC1.5

FIG. 5 illustrates $R_v/R_{uv}$ compromise, for a given value of $R_m^{NIR}$, for ZTiZQZTiZQ stacks (where Z stand for $ZrO_2$ layer, Ti for $TiO_2$ layer and Q for $SiO_2$ layer) on a substrate coated with HC1.5. This graph is plotted according to the following method. $R_m^{NIR}$ is set to 40%. Then, a specific Rv value is selected (from 0.1 to 1.5%) and antireflective coating structure (i.e. thicknesses of each metal oxide layers) is optimized to reach the lowest $R_{uv}$ value, with the defined materials and order of layers.

From FIG. 5, one learns that antireflective coatings cannot reach the domain below the curve for the targeted $R_m^{NIR}$ performance while using defined materials and order of layers. But very good compromises can be obtained, as illustrated by examples 2, 4, 6 or 13.

The invention claimed is:

1. An optical article comprising a transparent substrate with a front main face and a rear main face, at least one of the main faces being coated with an interferential coating, wherein said interferential coating comprises a stack comprising:
    at least one LI layer having a low refractive index <1.6,
    at least two HI/VHI/HI triplet having three layers composed of a VHI layer having a very high refractive index ≥2.1 and two HI layers having a high refractive index ≥1.6,
wherein said interferential coating comprises, in a direction moving away from the substrate, the following layers which are in direct contact with each other: one HI/VHI/HI triplet/ one LI layer/one HI/VHI/HI triplet/one LI layer;
wherein mean reflectance in ultra violet (UV) wavelength between 280 nm and 380 nm region $R_{uv}$ of said interferential coating is lower than or equal to 10% at an angle of incidence comprised between 30° and 45°.

2. The optical article of claim 1, wherein the HI layers have a high refractive index ≥1.6 and <2.1.

3. The optical article of claim 1, wherein mean light reflection factor in the visible region (wavelength between 380 nm and 780 nm) $R_v$ of said interferential coating is lower than or equal to 1.5% at an angle of incidence lower than 35°.

4. The optical article of claim 1, wherein mean reflectance in the near infrared (NIR) region (wavelength between 780 nm and 1400 nm) $Rm^{NIR}$ of said interferential coating is higher than or equal to 30% at an angle of incidence lower than 35°.

5. The optical article of claim 1, wherein the mean reflectance in ultra violet (UV) region $R_{uv}$ of said interferential coating is lower than or equal to 5% at an angle of incidence comprised between 30° and 45°.

6. The optical article of claim 1, wherein averaged reflection factor for blue light RmB (wavelength between 420 nm and 450 nm) of said interferential coating is higher than or equal to 10% at an angle of incidence lower than 35°.

7. The optical article of claim 1, wherein said interferential coating comprises at least two HI/VHI/HI triplets.

8. The optical article of claim 1, wherein said interferential coating comprises, in the direction moving away from the substrate:
- one HI layer having a physical thickness ranging from 40 to 75 nm;
- one VHI layer having a physical thickness ranging from 45 to 85 nm;
- one HI layer having a physical thickness ranging from 20 to 50 nm;
- one LI layer having a physical thickness ranging from 100 to 215 nm;
- one HI layer having a physical thickness ranging from 20 to 70 nm;
- one VHI layer having a physical thickness ranging from 5 to 80 nm;
- one HI layer having a physical thickness ranging from 25 to 50 nm;
- one LI layer having a physical thickness ranging from 45 to 80 nm.

9. The optical article of claim 1, wherein said interferential coating comprises, in the direction moving away from the substrate:
- one HI layer having a physical thickness ranging from 35 to 64 nm;
- one VHI layer having a physical thickness ranging from 40 to 80 nm;
- one HI layer having a physical thickness ranging from 25 to 45 nm;
- one LI layer having a physical thickness ranging from 120 to 180 nm;
- one HI layer having a physical thickness ranging from 20 to 70 nm;
- one VHI layer having a physical thickness ranging from 5 to 50 nm;
- one HI layer having a physical thickness ranging from 30 to 50 nm;
- one LI layer having a physical thickness ranging from 50 to 75 nm.

10. The optical article of claim 1, wherein the HI layers comprises one or more metal oxides selected from: zirconia ($ZrO_2$), alumina ($Al_2O_3$), praseodymium oxide ($Pr_2O_3$), praseodymium titanate ($PrTiO_3$), lanthanum oxide ($La_2O_3$), yttrium oxide ($Y_2O_3$), niobium oxide ($Nb_2O_5$), tantalum pentoxide ($Ta_2O_5$), titanium dioxide ($TiO_2$).

11. The optical article of claim 1, wherein the HI layers comprises zirconia ($ZrO_2$).

12. The optical article of claim 1, wherein the VHI layer comprises one or more metal oxides selected from: niobium oxide ($Nb_2O_5$), titanium dioxide ($TiO_2$), tantalum pentoxide ($Ta_2O_5$) or mixture thereof.

13. The optical article of claim 1, wherein a physical thickness of said interferential coating is lower than or equal to 1 μm.

14. The optical article of claim 1, wherein the physical thickness of said interferential coating is lower than or equal to 550 nm.

15. The optical article of claim 1, wherein the physical thickness of said interferential coating is between 400 to 550 nm.

16. The optical article of claim 1, wherein said optical article is an ophthalmic lens.

* * * * *